US006314221B1

(12) United States Patent
Riant et al.

(10) Patent No.: US 6,314,221 B1
(45) Date of Patent: Nov. 6, 2001

(54) FILTERING OPTICAL FIBER HAVING A MODIFIED PHOTOSENSITIVITY PROFILE

(75) Inventors: Isabelle Riant; Pierre Sansonetti, both of Palaiseau (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/323,136

(22) Filed: Jun. 1, 1999

(30) Foreign Application Priority Data

Jun. 2, 1998 (FR) .................................................. 98 06905

(51) Int. Cl.⁷ ...................................................... G02B 6/34
(52) U.S. Cl. .............................. 385/37; 385/127; 385/141
(58) Field of Search .............................. 385/37, 127, 123, 385/141–146

(56) References Cited

U.S. PATENT DOCUMENTS

| | | |
|---|---|---|
| 4,474,427 | 10/1984 | Hill et al. . |
| 4,974,930 | 12/1990 | Blyer, Jr. et al. . |
| 5,832,156 | 11/1998 | Strasser et al. . |
| 5,883,990 | * 3/1999 | Sasaoka et al. . |
| 6,005,999 | 12/1999 | Singh et al. . |
| 6,038,359 | 3/2000 | Moslehi et al. . |
| 6,058,231 | * 5/2000 | Haggans et al. . |
| 6,069,988 | 5/2000 | Kokura et al. . |
| 6,104,852 | * 8/2000 | Kashyap . |
| 6,111,999 | 8/2000 | Espindola et al. . |
| 6,157,758 | 12/2000 | Abe et al. . |

FOREIGN PATENT DOCUMENTS

| | | |
|---|---|---|
| 0 310 438 | 4/1989 | (EP) . |
| 0 435 201 A2 | 7/1991 | (EP) . |
| 0 840 150 A2 | 5/1998 | (EP) . |
| WO 94/00784 | 1/1994 | (WO) . |
| WO 97/08574 | 3/1997 | (WO) . |
| WO 97/26571 | 7/1997 | (WO) . |

OTHER PUBLICATIONS

Patent Abstracts of Japan, vol. 012, No. 390 (P–722) Oct. 18, 1988 corresponding to JP 63 132205 A (Ricoh Co Ltd) dated Jun. 4, 1988.

* cited by examiner

*Primary Examiner*—Hung N. Ngo
(74) *Attorney, Agent, or Firm*—Sughrue, Mion, Zinn, Macpeak & Seas, PLLC

(57) ABSTRACT

It is shown that by modifying the photosensitivity profile it is possible to provide better adjustment of the characteristic curve of a filter, and in particular to eliminate a reflection peak that is present within the working band. The photosensitivity profile is inverted to a considerable extent. In practice, the core of the fiber has only 20% of photosensitive doping material compared with the quantity of photosensitive doping material present in the cladding of the fiber.

17 Claims, 3 Drawing Sheets

FILTERING OPTICAL FIBER HAVING A MODIFIED PHOTOSENSITIVITY PROFILE

The present invention relates to a frequency filter for modifying the transmission spectrum of an optical fiber. In the invention, the frequency filter is made in a portion of optical fiber that is modified to impart filtering ability thereto.

BACKGROUND OF THE INVENTION

In the field of optical fiber filters, it is known to make Bragg gratings in core sections of such optical fibers. Bragg gratings are made by periodically changing refractive index in the fiber material. Such changes are obtained by irradiating said sections of the fiber core with ultraviolet radiation. The change in refractive index caused by exposure to light is know as the "photo-refractive effect". This effect is permanent. The property of a material having an index capable of being modified under such light irradiation is referred to herein as "photosensitivity". In present technology, photosensitivity characteristics are related to a defect in germanium present in the silica matrix of the optical fiber. Other dopants making the core of the fiber photo-sensitive can also be used. The advantage of germanium is that it is normally present in the core of an optical fiber since it serves to increase the refractive index of the core of a fiber relative to the index of the cladding around the core. This index increase, also known as an "index step", serves to guide light signals in the core of the fiber.

During manufacture of an optical fiber, different layers of doped and undoped silica are deposited in succession inside a tube, with the layers adhering to the inside wall of the tube to build up progressively the various layers that are to constitute the optical fiber. The diameter of a preform made in this way is greater than the diameter of the fiber. The fiber is subsequently obtained by collapsing and drawing down the preform while hot.

To make a Bragg grating, a section of the fiber core that is to act as a filter is subjected selectively to periodic ultraviolet irradiation. This irradiation gives rise to permanent local changes of refractive index. These changes are linked to chemical and structural modification of the bonds of germanium atoms in the core. The variation in the value of the refractive index in the fiber core that results from these changes can be as great as a few parts per thousand.

The grating is then in the form of modulation in the refractive index along the section forming an attenuating fiber.

Conventionally, when the changes of the index grating are perpendicular to the axis of the optical fiber, the quantity of light that is not transmitted by the fiber is reflected back along the core of the optical fiber with reflection being at a maximum at the Bragg wavelength determined by a resonance condition. Physically, coupling is created between the fundamental mode propagating forward and the mode propagating in the opposite direction.

Depending on the length of the section that has been subjected to exposure, on the period ate which changes repeat along said section, and on the strong or weak nature of the changes (depending on the large or small variation in refractive index where the changes occur), it is possible to modify the following transmission characteristics respectively: bandwidth, center frequency, and degree of attenuation.

When the photo-induced index variations are strong, there also occurs coupling of the fundamental mode in the cladding modes at shorter wavelengths. According to the article "Optical fiber design for strong gratings photo-imprinting with radiation mode suppression" given at the OFC Conference San Diego 95, Post Deadline 5, by E. Delevaque et al., this can be avoided by doping a portion of the cladding that is close to the core with germanium. A fluorine co-dopant is then added in the cladding so as to re-establish the index step.

In a particular application, attempts have been made with such filters to compensate for the non-flat gain characteristic of the amplifiers used along very long distance optical links. Over very long distances, particularly those passing via undersea cables, the per kilometer attenuation of waves in the optical fibers is such that it is necessary to install optical amplifiers at intervals. It is known that such amplifiers unfortunately present the drawback of systematically favoring certain frequency components within the transmitted band.

This phenomenon becomes particularly troublesome when such optical amplifiers are used in wavelength division multiplex (WDM) type links, where different channels are conveyed by optical carriers at different frequencies for the purpose of increasing the overall capacity and the modularity of the system. Given the phenomenon that takes place within the optical amplifier, such favoring of particular wavelengths would be completely unaccepted if it were not regularly compensated. In this application, the aim is specifically to flatten the gain of erbium-doped optical fiber amplifiers. Naturally other applications could be envisaged.

This type of Bragg grating filter thus suffers from the drawback of acting as a partial reflector of those components of the amplified signal that are concerned by the filtering. A portion of the optical signal at these frequencies is thus returned by reflection into the optical amplifier. As a result, in the amplifying section, not only does the signal reflected by the filter return and interfere, but also the signal backscattered. by the fiber is returned into the line and degrades transmission characteristics.

To avoid this reflection, proposals have been made, in particular in the article "Wideband gain flattened erbium fiber amplifier using a photosensitive fiber blazed grating" by R. Kashyap, R. Wyatt, and R. J. Campbell, published in Electronics Letters of Jan. 21, 1993, Vol. 29, No. 2, pp. 154 to 156, to incline the fringes representative of index modulation zones. This can be done by causing interference between two beams from a frequency-doubled argon laser source providing a wavelength of 244 nm, and by inclining the normal to the section that serves as a filter relative to the bisector of the two exposure beams. It is also possible to use a phase mask that generates mainly two diffraction order: +1 and −1; together with a zero order that is very weak. In the above-mentioned article, the inclination is eight degrees, for example. The advantage of the inclination is to eliminate reflection. The effect of the inclination is to couple the fundamental mode propagating forwards with the radiative modes propagating in the opposite direction. These radiative modes are absorbed very quickly by the cladding, and they are referred to as "cladding modes". The spectral envelope of the set of frequency components in these various cladding modes can then be used as a characteristic of a filter for compensating the gain of optical amplifiers.

The drawback presented by that technique lies in the selectivity of the filter. When using standard telecommunications fibers, it is not possible with such a Bragg grating filter having inclined index changes to obtain a filter bandwidth of less than 20 nm, for example. In theory it is possible to act on the diameter of the core so as to reduce the bandwidth of the filter. The filter is thus more selective if the diameter of its core is larger, e.g. 9 µm instead of 3 µm. However this increase in diameter is limited. In addition, amongst other drawbacks, it has the drawback of requiring matching sections to be made between fiber with a large diameter core and fiber with a standard diameter core (already about 9 µm). Such matching is difficult to achieve.

Depending on the desired outcome, the attenuation of cladding modes is improved but the length of the grating can no longer be used to narrow the bandwidth of the filter. In practice, the smaller the angle, the more the filter can be selective, but simultaneously the greater the amount of residual emission by reflection of the type that occurs with right fringes. In contrast, the more the angle slopes, the smaller the effect of the reflection phenomenon but the wider the band of the filter, i.e. the filter is less selective. In any event, the compromise that is obtained is not satisfactory and attempts are being made to improve it.

A second problem with that type of filter lies in a secondary filter peak or "rebound" in a lower frequency band close to the working band where filtering is desired. This rebound is due to the above-mentioned residual reflection in fundamental mode. Initially the rebound is not troublesome since known optical amplifiers are of limited bandwidth and the filter rebound lies outside it. But even then, the rebound must remain small. However in other applications, in particular in land applications, the filter is used selectively to attenuate different components within the working band. The spectral position of the rebound therefore also lies within the working band. In these other application, the filtering rebound is therefore harmful.

Thirdly, as has been mentioned before, the attenuation spectrum is in fact an envelope of attenuations of different spectrum components. This means that within the envelope some spectral components are filtered effectively while others are filtered less well, or even not at all. This is due to the cladding modes being discrete. Under such conditions, the filtering envelope corresponds to a superposition of discrete and relatively narrow band filters that are spaced apart from one another by frequency gaps where filtering is not performed. Such a filter therefore cannot be used to equalize the gain of optical amplifiers correctly.

OBJECT AND SUMMARY OF THE INVENTION

In the invention, the second problem has been solved and the rebound has been almost completely eliminated by inverting the core-to-cladding photosensitivity profile. It has been found that reducing photosensitivity in the core makes it possible to reduce the strength of the index grating in the core, and thus to reduce the effect thereof. Residual reflection in the fundamental mode propagating in the core is thus decreased.

The invention thus provides a filtering optical fiber having a Bragg grating, the fiber comprising in a plurality of layers, a fiber core and fiber cladding, the fiber being doped by a photosensitive material whose index can be changed so as to make the Bragg grating by periodically changing the index of said material along a section of said fiber, wherein an inner portion thereof has non-zero photosensitivity that is less than the photosensitivity of an outer portion outside said inner portion.

BRIEF DESCRIPTION OF THE DRAWINGS

The invention will be better understood on reading the following description and on examining the accompanying figures. The figures are given purely by way of indication and do not limit the invention in any way. In the figures.

MORE DETAILED DESCRIPTION

Figure 1:
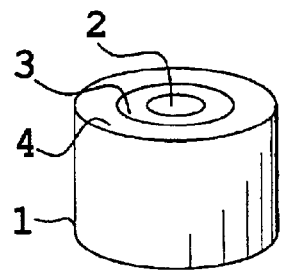
FIG. 1 shows an optical fiber preform suitable for making an optical fiber filter of the invention.

FIG. 1 shows an optical fiber preform 1. The perform 1 has a first cylinder surrounded by an inner cylindrical ring and an outer cylindrical ring 4. The cylinder and its rings represent the various layers of material present in the optical fiber after it has been made by drawing. The radial dimensions of the cylinder and cylindrical rings 2 to 4 are in the same proportions as the much smaller dimensions of the corresponding portions in the optical fiber once the fiber has been made by drawing. In practice, a fiber core and cladding corresponding respectively to layers 2 and 3 are each made up from a plurality of layers. The layers 2 to 3 are thus doped with different dopants while the preform is being built up.

Figure 2:
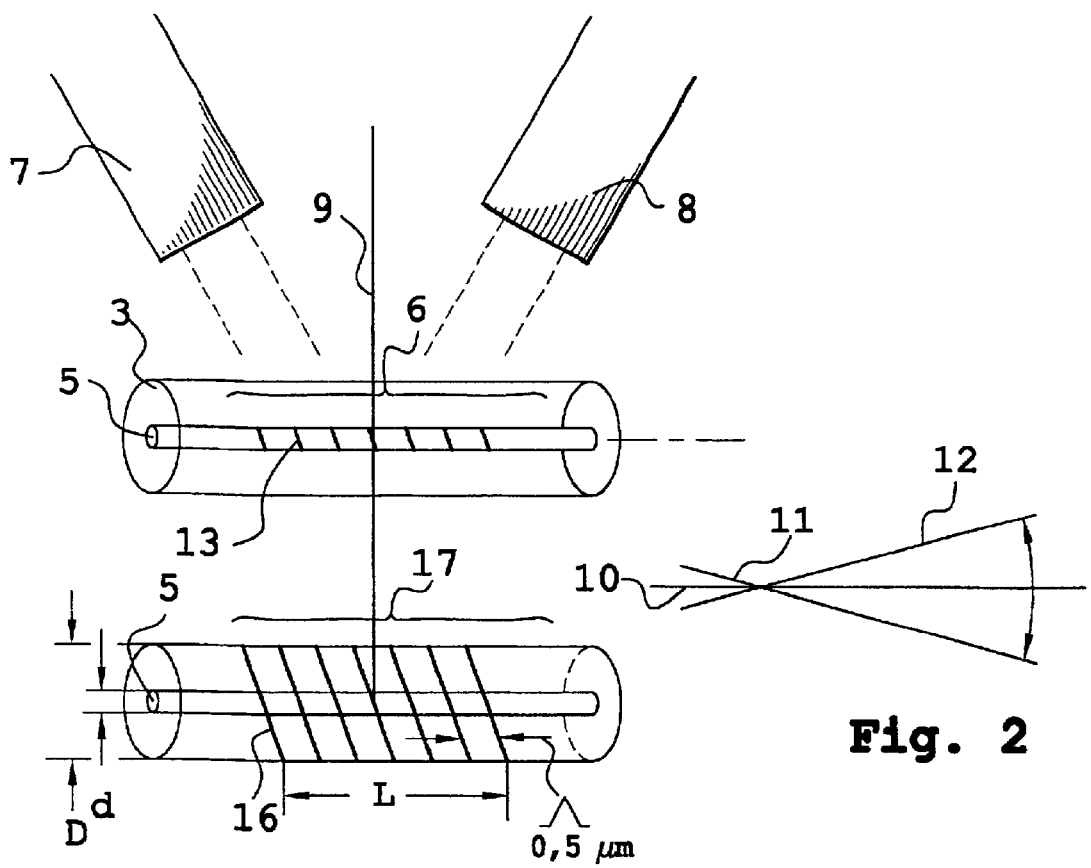
FIG. 2 shows a method that can be used in the invention for preparing the optical fiber for its filtering function.

FIG. 2 shows a preferred method of exposing a photosensitive material suitable for creating a grating of index changes, also known as an index grating, within the core 5 of a fiber. In a prior art fiber, the core 5 of the fiber is doped with germanium when the cylinder 2 is made. During exposure, the germanium is subjected over a length that corresponds to a filter section 6 to illumination produced by two laser beams 7 and 8 coming from a coherent laser source and inclined relative to each other. The bisector 9 of the angle between these beams extends substantially perpendicularly to the axis 10 of the core 5. As described in the cited document, the laser beams 7 and 8 can come from a frequency-doubled argon laser at wavelength of 244 nm. According to the teaching of that document, by inclining the axis 10 towards directions 11 or 12 relative to the normal of the bisector 9, it is possible to obtain inclined interference fringes, and thus a grating of index changes that are in an inclined form. FIG. 2 shows, coarsely and in section, the edges 13 of inclined disks. In practice, the degree of change varies between the fringes progressively between a minimum and a maximum. There are no true disks, but the representation is convenient.

In a variant, the inclined index grating could also be made by a phase mask device.

It is known to make cores 5 having a diameter d of nine micrometers (µm). Thus, the standard SMF-28 fiber from Corning Incorporated, New York, USA, is a monomode fiber having that diameter. The contributions of the cylinders 3 and 4 form a cladding-tube assembly of the fibers. In an example, and in particular in the example described above, the outside diameter D of the assembly is about 125 µm to 130 µm.

In the invention, instead of using germanium only for doping the materials 2 used for making the core 5, the material 3 constituting the cladding is also doped with germanium. As a result, at the time of exposure, fringes 16 develop not only in the core 5, but also in the cladding 3. In this case also, the bottom of FIG. 2 is diagrammatic, since the fringes are not strictly disks.

The section 17 in which these index changes develop depends on the size of the exposed region. It is of length L. The spacing between the maxima of the various changes is of size Λ (about 0.5 μm) corresponding to the interfringe spacing. Such periods serve to obtain filters at infrared wavelengths (about 1.5 μm). The strength of the change is linked to the power of the two laser beams 7 and 8, to the duration of the exposure, and to germanium concentration. These magnitudes are parameters that are useful for adjusting the filter constituted by the section 17.

Figure 3A:
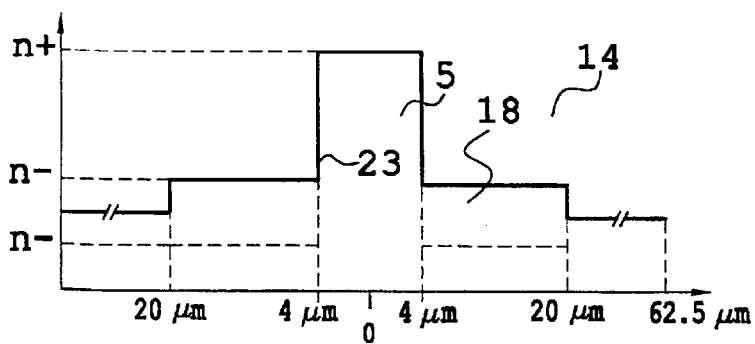
FIGS. 3a to 4b show the inverted photosensitivity profiles and the filter characteristics implemented in the invention.

FIG. 3a shows a refractive index that is preferably to be achieved in the optical fiber. The core 5 of the fiber is thus doped so as to reach a refractive index n+, e.g. having a value lying in the range 1.448 to 1.452. In the inner portion 18 of the cladding 3 (in the preferred example, the inner portion 18 corresponds to the entire cladding), the material constituting the cladding has been doped with both germanium and fluorine (or some other dopant having the same effects). The desired effect is to modify the normal refractive index of silica glass. For example, this can lead in the portion 18 of the optical fiber cladding 3 to having a refractive index n− of about 1.422 to 1.446. The index step 23 made in this way at the boundary between the core 5 and the cladding 3 is thus equal to n+−n−. When the diameter of the cladding 3 is large, e.g. 20 μm, it can be considered that this index step is the index step required for monomode propagation. It is shown below how, the various factors interact to improve the filter of the invention. In particular, after selecting the diameter of the portion of the cladding that is to be doped with germanium so as to satisfy the constraint on filter bandwidth, an index step value Δn is determined so as to optimize the filter envelope in terms of making it as smooth as possible. For example, for a core diameter of 8 μm, it has been found that an index step of $5 \times 10^{-3}$ (1.449−1.444)is the most appropriate. The various dopants in the cladding serve to obtain this step in the zone 18.

Figure 3B:
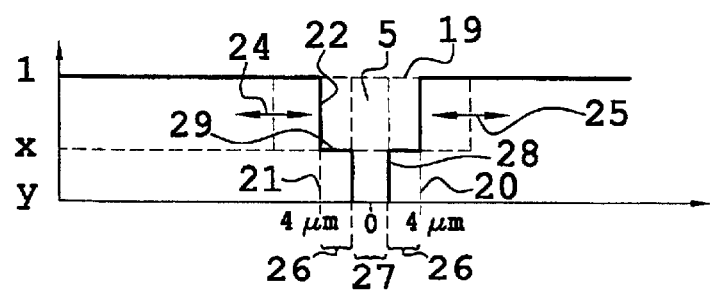

FIG. 3b shows the photosensitivity profile obtained in the fiber in accordance with the invention. This photosensitivity profile is normalized to 1. The normalized value corresponds to a given concentration of the photosensitive dopant material, distributed in various parts of the fiber, and also to a method common to all of the fiber for exposing the photosensitive material. FIG. 3b is thus a summary representative of the concentration of the photosensitive dopant material in the various portions of the fiber. It shows an inversion of photosensitivity, with the outer portions of the fiber being more photosensitive than the inner portions.

In the state of the art, as shown in the top of FIG. 2, only the materials 2 serving to make the core of the fiber is doped with a photosensitive material. This is recalled in FIG. 3b by dashed lines 19, 20, and 21 which respectively show the concentration of doping substance (germanium), and the abscissa limits of the location where the dopant is implanted (4 μm on either side of the center of the core 5). In the invention, a photosensitivity step 22 is created which has the feature of an inner portion of the fiber, in this case for example the core 5, having a photosensitivity index (and thus a concentration of photosensitive material) that is less than or equal to (but preferably less than) the photosensitivity index of an outer portion, e.g. the inner layer 18 of the cladding. The photosensitivity profile is thus inverted.

The step 22 thus implies that photosensitive material is present in the layer 18 of the cladding. To prevent the refractive index step 23 then extending beyond the core 5, provision is made in the portion 18 to compensate for the effects on refractive index of doping with a photosensitive material by doping with a material that has the opposite effect from this point of view: for example fluorine. Under such conditions, it is possible for the step 22 to be displaced beyond the step 23 symmetrically along arrows 24 and 25 into the portion 18 of the cladding 3. As a result, even if the germanium doping boundary 22 is not located at the position 23 of the core-to-cladding transition, it does not impede proper operation of the optical fiber in waveguide terms since the index step 23 is maintained in the same position.

Rather than moving the inverted photosensitivity step 22 into the cladding 3, it is possible to make a fiber core 5 that has a nominal concentration of photosensitive material in an outer potion, in particular a ring 26, but that has a deficit or even complete absence of the photosensitive material in a central portion 27 of the core. FIG. 3b also shows this variant. There is no difficulty in obtaining such an embodiment since in practice, the materials 2 and 3 of the core and of the cladding as shown in FIG. 1 are themselves made as concentric rings, so they can be made out of different materials. In this case, the special feature of the invention thus lies in the fact that the portion 27 of the core 5 is provided with a dopant that contributes to the refractive index step 23 (e.g. phosphorus) but which does not contribute or which contributes less to the photosensitivity index in this portion.

By combining the two techniques, the photosensitivity index step can even be replaced by two photosensitivity steps 22 and 28 by combining both variants. The photosensitivity profile then has the appearance of a staircase 29. The relative levels x and y of photosensitivity and the abscissae of the steps 22 and 28 open up a vast range of adjustments and selections for various filter parameters. In FIG. 3b, y is zero, but that is not essential. By making the inversion shown in FIG. 3b, the desired result of eliminating the residual reflection rebound of the main mode by the filter is achieved.

Figure 4A:
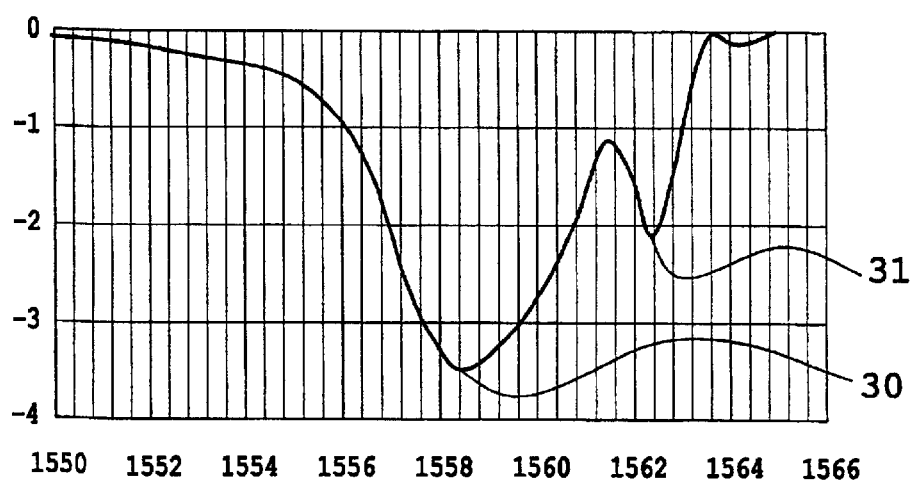

By way of example, FIG. 4a applies to a filter in which the index changes are inclined at 3° and in which the length L of the filter section is equal to 0.7 mm, and it shows the filter characteristic curve for a conventional photosensitivity index (nominal) photosensitivity 19 in the core of the cladding). In this case, the looked-for filtering is approximately obtained with an attenuation peak 30 which results from the coupling of the main mode in the cladding mode, in this case at a center frequency corresponding substantially to a wavelength of 1558.2 nm.

Beside the looked-for peak 30, FIG. 4a shows that the filter made in this way also gives rise to reflection 31 in a fundamental mode centered on f0 of about 1562.2 nm. Although the attenuation 30 is desired, the peak 31 is harmful. In a given application, it can happen that the attenuation frequency 31 lies in the middle of a band that is to be transmitted. Under such circumstances, the unwanted effects of the attenuation 31 would make the filter unusable.

Figure 4B:
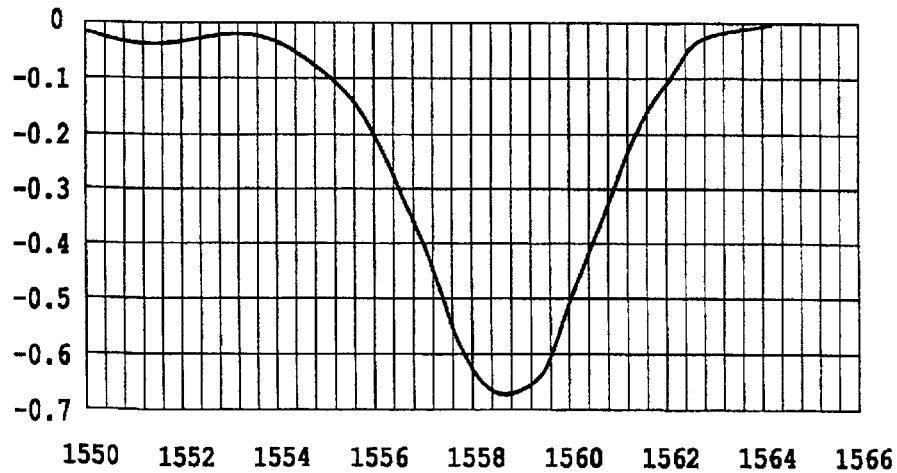

In FIG. 4b, there can be seen the effect of the improvement provided by the invention: the reflection peal 31 is eliminated. Furthermore, the filter gain with such a filter can be 0.7 dB whereas it culminates at 4 dB with the filter of FIG 4a. Consequently, in the invention, if a large amount of attenuation is necessary, a plurality of filter sections 17 can be juxtaposed in the fiber at sufficient spacing apart from one another, each providing a smoothed contribution to filtering.

In another improvement of the invention, it has been found that there is even an optimum when it is desired to retain certain manufacturing parameters for eliminating the fundamental reflection mode 31 situated on the low frequency side of the band of the filter.

In the invention, it has been shown that obtaining an optimum is possible on all occasions, whatever the parameters n+, n−, x, y, abscissa 22, or abscissa 28 that is modified and also whatever the concentration of dopant corresponding to nominal concentration (nominal level 1) and the determined degree of change.

The method of selecting the parameters of the fiber is as follows. Firstly the width of the zone 18 is selected to satisfy filter bandwidth constraints. Then an indexed step $\Delta n$ is selected so as to have a filter that is more or less symmetrical. Then the depth of the inversion is adjusted to eliminate the rebound 31. Finally, the length of the section 17 is selected to maximize smoothing. Thus, a non-reflecting attenuating filter having a spectrum bandwidth of 9 nm can be achieved using an index grating inclined at 3° in a fiber having photosensitive cladding that is 20 $\mu$m thick. An optimum can be found for the filter characteristic with an index step of $5 \times 10^{-3}$. Thereafter, concerning the photosensitivity profile, an optimum can be found for reducing reflection in the fundamental mode. This optimum is a photosensitivity ratio between the core and the cladding of 20%. It can lie in the range 10% to 60% for other desired filter functions.

FIG. 4b thus corresponds to the case of FIG. 3b in which there is no zone 27, and in which the value of x is 20%. In this example, the concentration of germanium in the cladding is about 5% by weight. It is thus 1% by weight throughout the core 5 of the fiber.

Figure 5:
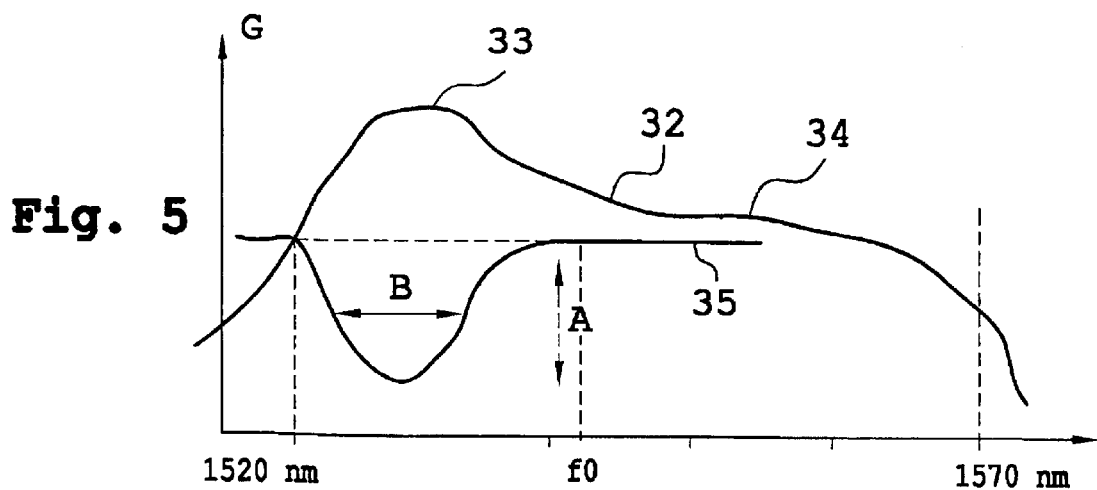
FIG. 5 is a frequency diagram showing the amplification defects of erbium-doped fiber amplifiers in a particular application, and the correction provided by the filter of the invention.

FIG. 5 shows a curve 32 which represents symbolically, and with a certain amount of exaggeration, the harmful effects of optical amplifiers based on erbium-doped fiber amplifiers (EDFAs). Such amplifiers are advantageous because they have broad bandwidth centered on wavelengths that are used in optical transmission. Nevertheless, they suffer from the drawback of giving rise to over-amplification 33 at certain points in the spectrum compared with the amplification 34 at other points in the spectrum. It is this over-amplification 33 which must be countered with a filter interposed on waves propagating from these amplifiers.

Curve 35 is a diagram representing the filter obtained by installing a filtering section 17 made as shown in the bottom portion of FIG. 2. The characteristics of the filter are its characteristic frequency f0, the amplitude A of the selective attenuation that it provides, and its bandwidth B. In known manner, f0 depends on $\Lambda$, A depends on the degree of change to the photosensitive materials in the fiber, and for a conventional Bragg grating having right changes, B depends on the length L of the section 17. The greater the length L, the narrower the bandwidth B can be made.

In the state of the art, with inclined changes, where only the core 5 of the fiber was doped with germanium, the bandwidth B was greater than the bandwidth of overamplification 33. Consequently, the filter was poorly matched in frequency terms. For reasons mentioned above, when using inclined index changes, it is no help to increase the length L.

Figure 6A:
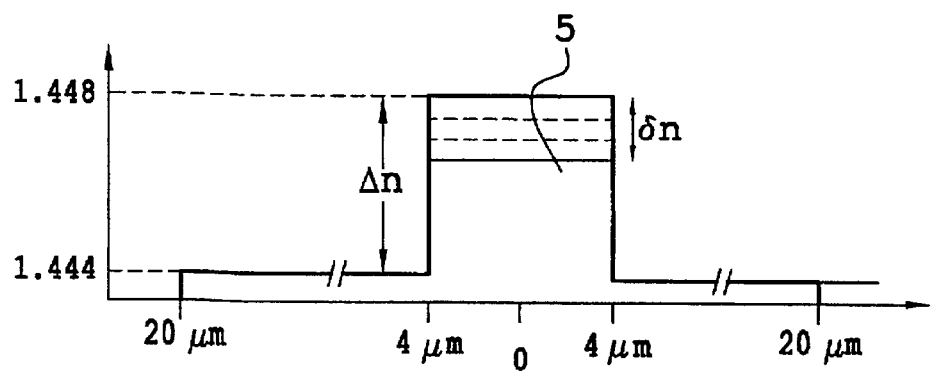
FIGS. 6a and 6b are respectively a refractive index profile and a photosensitivity profile for the core and the cladding of the optical fiber filter of the invention.
Figure 6B:
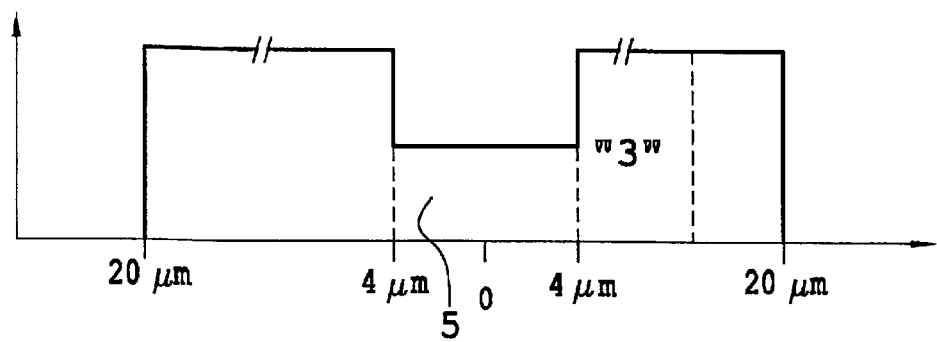

FIG. 6a and 6b are respectively the index profile and a photosensitivity profile implemented in a fiber having an improvement to the invention. Relative to an abscissa 0 that is central and in the middle of the core 5 of the fiber, there can be seen on either side at about 4 $\mu$m the edges of the diameter of the core 5, and at about 20 $\mu$m the edges of the diameter of the cladding 3. The refractive index profile is such that it presents a step $\Delta n$ of about 0.5%. This index step is necessary to ensure that only a single main optical mode propagates in the core of the fiber. This index profile is obtained by doping the core of the fiber with materials that have this property of increasing its refractive index. As a general rule, doping is performed with germanium. It is also possible to use phosphorus which likewise serves to increase refractive index.

Germanium has usable photosensitivity due to changes to its chemical bonds and structure due to exposure, for the purpose of making a grating of index changes. Thus, the refractive index varies along the section 17 with variation $\delta n$ that is progressive and periodic from one fringe to the next. The variation $\delta n$ is a fraction of $\Delta n$.

FIG. 6b shows that the photosensitivity profile has been extended in this improvement into all or part of the fiber body: not only in the core 5 but also in at least a portion of the cladding 3. Preferably, the photosensitivity profile is extended to all of the cladding layer. In this preferred embodiment, the cladding layer is set at 20 $\mu$m. This makes it possible to obtain a filtering width of 9 mm to 10 mm. It is also possible to limit the extension to the inner portion of the cladding layer 3. By acting on the width of the extension through all or part of the cladding 3, it is possible to vary the selectivity of the filter. Other conditions can further limit the filtering width.

It has been shown by experiment that this disposition associated with inclined fringes makes it possible to adjust the filter bandwidth B of the filter so as to be appropriate for a given application. For example, when the application relates to amplification as shown in FIG. 5, it is thus possible to compensate over-amplification 33 using a filter frequency bandwidth B of about 8 nm or 9 nm. Depending on the desired bandwidth B, the doped portion of the layer 3 can be thicker or thinner.

Doping the cladding of the fiber in the filter section with germanium can lead to a change in the index profile in said outer layer as occurs in the core 5. As a general rule, the core is doped with germanium to a weight percentage lying in the range 0 to 11%. If the cladding 3 is made in the same way, then the index profile no longer makes it possible to delimit the core 5 correctly relative to the cladding 3. The fiber will no longer propagate the main wave correctly.

To remedy this problem, the invention provides for doping the cladding 3 with fluorine. The effect of fluorine in the refractive index is opposite to that of germanium. It reduces the refractive index rather than increasing it. By compensating the quantities of fluorine and germanium in the cladding, it is possible to maintain an index profile as shown in FIG. 6a, while maintaining a photosensitivity profile as shown in FIG. 6b, because of the presence of the germanium doping. Under these conditions, it is indeed possible to manufacture a filter section L as shown in the bottom of FIG. 2 where the index grating extends into all or a part of the cladding 3.

The invention thus notionally increases the radius of the core by multiplying it by five (going form 4 $\mu$m to 20 $\mu$m). This makes the filter more selective.

In addition, tests have shown that there exists an optimum from the point of view of the filter envelope when the length L is 0.7 mm. In this case, it has been found that it is no longer possible to distinguish between the various different levels of attenuation corresponding to the discrete coupling in the various cladding modes. The envelope 35 no longer presents any ripple.

What is claimed is:

1. A filtering optical fiber having a Bragg grating, the fiber comprising in a plurality of layers, a fiber core and fiber cladding, the fiber being doped by a photosensitive material whose index can be changed so as to make the Bragg grating by periodically changing the index of said material along a section of said fiber, wherein an inner portion thereof has non-zero photosensitivity that is less than the photosensitivity of an outer portion outside said inner portion.

2. A fiber according to claim 1, wherein the reduction in photosensitivity is obtained by reducing the concentration of a photosensitive dopant, the concentration in the inner portion and the concentration in the outer portion preferably being in a ration of 20%.

3. A fiber according to claim 1, wherein the inner and outer portions are placed respectively in the core and in the cladding of the fiber.

4. A fiber according to claim 1, wherein the inner and outer portions are placed in the core of the fiber.

5. A fiber according to claim 1, wherein the photosensitive dopant is germanium.

6. A fiber according to claim 1, wherein there exists a location where the photosensitive dopant is present at lower concentration, with the fiber receiving additional doping by means of a dopant that is not photosensitive.

7. A fiber according to claim 1, wherein the non-photosensitive dopant is phosphorus.

8. A fiber according to claim 1, wherein the reduction in photosensitivity is adjusted to an optimum so as to eliminate a mode of reflected light transmission by the filter section, said optimum being a function of the core-to-cladding refractive index profile.

9. A fiber according to claim 1, wherein the cladding is doped with a material whose refractive index can be changed, and wherein said cladding material has its refractive index changed to form a longitudinal grating of index changes that are periodic and inclined.

10. A fiber according to claim 1, wherein the length of a filter section is less than 1 mm, and is preferably equal to 0.7 mm.

11. An optical fiber, comprising
a core; and
a cladding; and
wherein said core and said cladding are doped, respectively, with a first photosensitive material such that a section of said optical fiber, upon exposure to radiation that periodically changes a refractive index of said first photosensitive material, forms a Bragg grating;
wherein said core has a refractive index that is greater than a refractive index of said cladding adjacent said core;
wherein said core has a photosensitivity that is less than a photosensitivity of said cladding adjacent said core; and
wherein said cladding is further doped with a second material that alters the refractive index of said cladding in a direction opposite to that of said first photosensitive material.

12. The optical fiber according to claim 11, wherein said second material is fluorine.

13. The optical fiber according to claim 12, wherein said first photosensitive material is germanium.

14. An optical fiber, comprising
a core; and
a cladding; and
wherein said core and said cladding are doped, respectively, with a first photosensitive material such that a section of said optical fiber, upon exposure to radiation that periodically changes a refractive index of said first photosensitive material, forms a Bragg grating;
wherein said core has a refractive index that is greater than a refractive index of said cladding adjacent said core;
wherein said core has a photosensitivity that is less than a photosensitivity of said cladding adjacent said core; and
wherein said core is further doped with a second material that alters the refractive index of said core and has a photosensitivity that is less than the photosensitivity of said first photosensitive material.

15. The optical fiber according to claim 14, wherein said core has a center portion with a photosensitivity that is less than a photosensitivity of a portion of said core outside said center potion.

16. The optical fiber according to claim 15, wherein core center portion has substantially no photosensitivity.

17. The optical fiber according to claim 14, wherein said second material is phosphorus.

* * * * *